United States Patent
Campbell et al.

(10) Patent No.: US 10,697,582 B2
(45) Date of Patent: Jun. 30, 2020

(54) LIDAR HINGED MOUNT

(71) Applicant: GroundProbe Pty Ltd, Windsor Qld (AU)

(72) Inventors: Lachlan Campbell, Windsor (AU); Ben Guymer, Windsor (AU); Benny Chen, Everton Park (AU)

(73) Assignee: GroundProbe Pty Ltd, Windsor Qld (AU)

(*) Notice: Subject to any disclaimer, the term of this patent is extended or adjusted under 35 U.S.C. 154(b) by 194 days.

(21) Appl. No.: 15/814,586

(22) Filed: Nov. 16, 2017

(65) Prior Publication Data

US 2019/0063670 A1 Feb. 28, 2019

(30) Foreign Application Priority Data

Aug. 31, 2017 (AU) .................. 2017221839

(51) Int. Cl.
| | | |
|---|---|---|
| *G01S 7/481* | (2006.01) | |
| *F16M 13/02* | (2006.01) | |
| *F16M 11/38* | (2006.01) | |
| *F16M 11/12* | (2006.01) | |
| *G01S 17/88* | (2006.01) | |
| *F16M 11/06* | (2006.01) | |
| *F16M 11/20* | (2006.01) | |

(52) U.S. Cl.
CPC .......... *F16M 13/02* (2013.01); *F16M 11/123* (2013.01); *F16M 11/38* (2013.01); *G01S 7/4813* (2013.01); *F16M 11/06* (2013.01); *F16M 11/2007* (2013.01); *F16M 2200/022* (2013.01); *F16M 2200/024* (2013.01); *G01S 17/88* (2013.01)

(58) Field of Classification Search
CPC ...... F16M 13/02; F16M 11/38; F16M 11/123; F16M 2200/022; F16M 2200/24; F16M 11/2007; G01S 7/4813; G01S 17/88
See application file for complete search history.

(56) References Cited

U.S. PATENT DOCUMENTS

| | | | |
|---|---|---|---|
| 6,232,928 B1 * | 5/2001 | Zimmerman | ........ H01Q 1/1242 343/882 |
| 8,794,578 B2 * | 8/2014 | Lin | ...................... H01Q 1/1228 248/218.4 |

(Continued)

FOREIGN PATENT DOCUMENTS

| | | |
|---|---|---|
| WO | 02/46790 A1 | 6/2002 |
| WO | 2017/063033 A1 | 4/2017 |

*Primary Examiner* — Tan Le
(74) *Attorney, Agent, or Firm* — Howard & Howard Attorneys PLLC

(57) ABSTRACT

The invention is a mounting bracket particularly suited for mounting monitoring equipment in underground mines. The mounting bracket comprises a wall mounting plate and a levelling bracket removably attachable to the wall mounting plate. A first hinge member on one of the wall mounting plate or the levelling bracket and a second hinge member on the other of the wall mounting plate or the levelling bracket together form a hinge that engages between the wall mounting plate and the levelling bracket allowing the levelling bracket to be swung down to reduce it's profile or to be removed entirely. A locking screw locks the hinge to prevent hinged movement between the levelling bracket and the wall mounting plate when in use.

13 Claims, 2 Drawing Sheets

(56) References Cited

U.S. PATENT DOCUMENTS

| | | | | |
|---|---|---|---|---|
| 2007/0258196 A1* | 11/2007 | Koskinen | ............... | F16M 13/02 |
| | | | | 361/679.01 |
| 2008/0029669 A1* | 2/2008 | Olah | ................... | B60R 11/0229 |
| | | | | 248/276.1 |
| 2010/0259462 A1* | 10/2010 | Yeh | ........................ | H01Q 1/125 |
| | | | | 343/882 |
| 2010/0314514 A1* | 12/2010 | Nelson | ................... | F16M 11/08 |
| | | | | 248/219.1 |
| 2019/0250251 A1* | 8/2019 | Gibson | ................... | G01S 17/10 |

* cited by examiner

LIDAR HINGED MOUNT

CROSS-REFERENCE TO RELATED APPLICATION

This application claims priority to Australian Patent Application No. 2017221839, filed Aug. 31, 2017, the disclosure of which is hereby incorporated by reference in its entirety.

FIELD OF THE INVENTION

The present invention relates to the field of mining. More particularly, the invention relates to a mounting bracket for a LiDAR device that is designed for use in underground mines.

BACKGROUND OF THE INVENTION

The Applicant has developed very effective devices for monitoring stability of a slope, particularly in mining applications. Their earliest products are described in International Patent Publication number WO02/046790 titled Slope Monitoring System. More recently they have described a product based on LiDAR which also monitors slope stability. The innovation is described in International Patent Publication number WO2017/063033. The entirety of the content of these patent publications is incorporated herein by reference.

The Applicant has realised that the LiDAR product has very useful application to monitoring mining walls and roofs in underground mines. However, the underground mine environment is very harsh and hazardous to equipment. It has been realised that mounting a LiDAR device in an active area of a mine can be problematic. In particular, it is likely that the LiDAR equipment will be bumped or knocked by vehicles or personnel moving in the vicinity of the LiDAR device. In fact, the LiDAR device will be in danger of suffering serious damage or being destroyed if it must be positioned in a drift in order to observe a mined wall. The passage of trucks and excavators along the drift often causes damage to any equipment in or near their path. Basically, trucks scrape the walls and anything jutting from the wall will be damaged.

It is clearly impractical to mount a LiDAR device using a conventional tripod or similar. A preferred approach is to mount the LiDAR on a bracket on the wall. However, as mentioned above, this has a high degree of risk.

It is also important for periodic monitoring to be able to return the equipment to the same location and position so that parallax error and other noise sources are minimised or eliminated. Precise positioning is important to data integrity and to reduce the need to reprocess data to remove noise created by positioning error.

SUMMARY OF THE INVENTION

In one form, although it need not be the only or indeed the broadest form, the invention resides in a mounting bracket comprising:
a wall mounting plate;
a levelling bracket removably attachable to the wall mounting plate;
a first hinge member on one of the wall mounting plate or the levelling bracket and a second hinge member on the other of the wall mounting plate or the levelling bracket, the first hinge member and the second hinge member together forming a hinge that engages between the wall mounting plate and the levelling bracket; and
a locking screw that locks the hinge to prevent hinged movement between the levelling bracket and the wall mounting plate.

Suitably the first hinge member is a hinge slot and the second hinge member is a hinge plate. Alternatively the first hinge member is a hinge plate and the second hinge member is a hinge slot.

The hinge slot may further comprise a stop that limits the range of movement of the hinge plate.

In a preferred form the hinge slot and the hinge plate are shaped to provide repeatable location with angled surfaces and edges.

The hinge slot suitably comprises a V-groove.

In a further preferred form the hinge slot is shaped for fall-prevention. Suitably the levelling bracket cannot be removed from the wall plate without lifting of the levelling bracket.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF INVENTION

Figure 1:
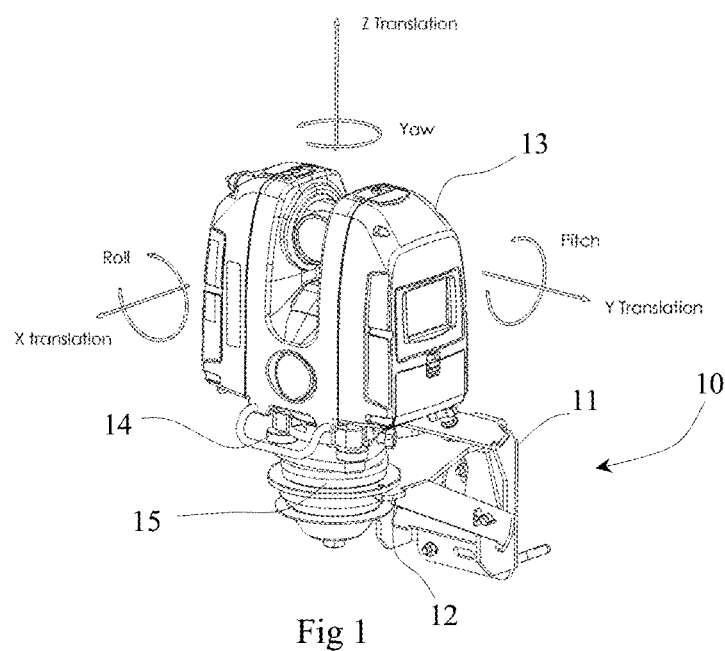
FIG. 1 shows a LiDAR device mounted on a tribrach, on a gimbal mount, on a mounting bracket.

Embodiments of the present invention reside primarily in a mounting bracket for mounting a LiDAR device for underground mining applications. Accordingly, the elements have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is a shown a mounting bracket generally indicated as 10. The mounting bracket 10 comprises a wall mounting plate 11 and a levelling bracket 12. In the embodiment of FIG. 1 the mounting bracket 10 is shown mounting a LiDAR device 13. The LiDAR device 13 is mounted on a tribrach 14 which allows fine adjustment of pitch and roll. The tribrach 14 sits in a gimbal assembly 15 that allows coarse adjustment of yaw, pitch and roll. For ease of reference six degrees of freedom of movement are shown in FIG. 1.

Figure 2:
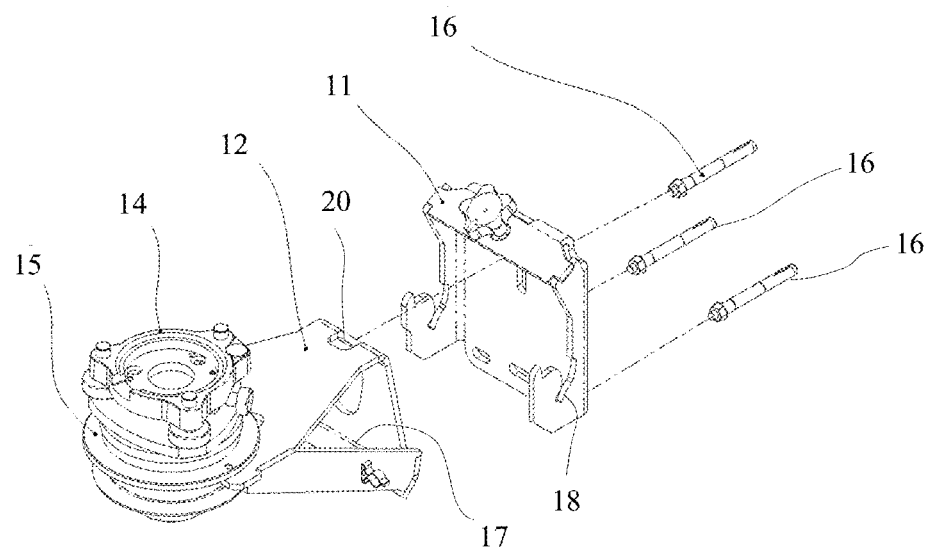
FIG. 2 shows an exploded view of the bracket of FIG. 1.

Turning to FIG. 2, the details of the mounting bracket 10 are shown more clearly. The wall mounting plate 11 is fixed to a wall by anchor bolts 16 through apertures in the plate. The anchor bolts may be bonded in place but more conveniently are expansion type bolts having an expansion sleeve that wedges the bolt in place when tightened. The wall mounting plate 11 is attached to the anchor bolts 16 by a nut and washer so that, in principal, it can be removed. However, in practice, the wall mounting plate is fixed in place and left in place for as long as it may be used.

The levelling bracket 12 is attached to the wall mounting plate 11 by a first hinge member in the form of a hinge plate 17 and a second hinge member in the form of a hinge slot 18. The hinge plate 17 and hinge slot 18 form a hinge between the levelling bracket 12 and the wall mounting plate 11. In the embodiments shown the hinge plate 17 is formed on the levelling bracket 12 and the hinge slot 18 is formed in the wall mounting plate 11, however there this is only a preferred arrangement and the opposite configuration is also suitable. That is to say, although not shown, the hinge plate 17 could be formed on the wall mounting plate 11 and the hinge slot 18 could be formed in the levelling bracket 12.

Figure 3:
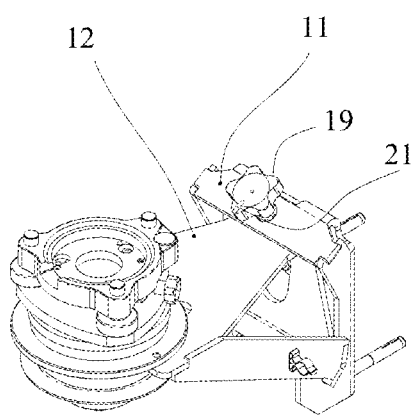
FIG. 3 shows the bracket of FIG. 1 in an "in use" position.

As is evident in FIG. 3, the hinge plate 17 engages positively with the hinge slot 18 to effectively eliminate movement of the levelling bracket 12. A locking screw 19 clamps the levelling bracket 12 onto the wall mounting plate 11 and prevents movement of the hinge plate 17 in the hinge slot 18. The locking screw 19 preferably has a threaded shaft that engages a threaded hole in the wall mounting plate 11. The end of the locking screw 19 engages a depression or slot 20 in the levelling bracket 12 to provide positive engagement. A marker 21 on the locking screw 19 may be provided as an indicator that locking screw is fully locked.

FIG. 3 shows the mounting bracket 10 in a position for use. The hinge plate 17 is firmly seated in the hinge slot 17 and the locking screw 19 is engaged against the slot 20 in the levelling plate 12 with the marker 21 indicating the locked position. In this position the LiDAR device 13 is mounted on the tribrach 14 for use.

Figure 4:
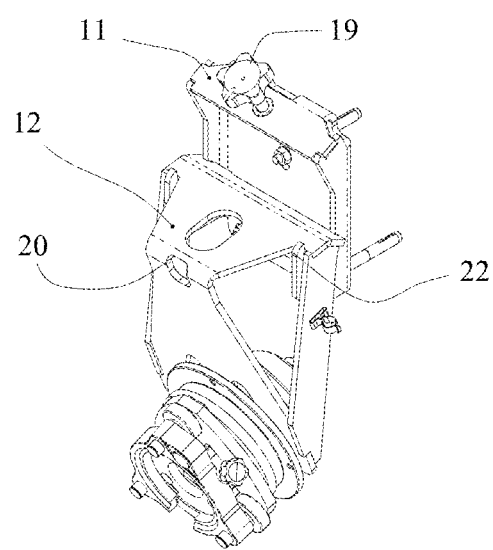
FIG. 4 shows the bracket of FIG. 1 in a "not in use" position.

When the LiDAR device 13 is not in use it can be removed and used elsewhere. The LiDAR device 13 is removed from the Tribrach 14 and either safely stored, or more likely, used at another site. The locking screw 19 is unscrewed and the hinge plate 17 is moved slightly upwards in the hinge slot 18 so that the levelling bracket 12 may swing forward and pivot down relative to the wall mounting plate 11. The levelling bracket 12 is retained on the wall mounting plate 11 by stops 22 that provide a lip to prevent the hinge plate 17 sliding from the wall mounting plate 11. FIG. 4 shows the levelling bracket 12 in the "not in use" position on the wall mounting plate 11.

In the preferred embodiment the hinge slot 18 and the hinge plate 17 are specially shaped to provide repeatable location with angled surfaces and edges, so the hinge plate 17 engages in a v-groove within the slot 18. The method maximizes accuracy while maintaining low cost manufacture. The hinge slot 18 is also specially shaped to provide a fall-prevention function in case of inadvertent release of the locking screw 19. This is an important safety feature. The levelling bracket 12 cannot fall, stow, or be removed from the wall plate 11 without the user first lifting the unit.

The inventors expect it will be convenient to leave the levelling bracket 12 in place on the wall mounting plate 11 so that it can be easily repositioned and locked when it is next needed. However, the levelling bracket 12 can be completely removed from the wall mounting plate 11 to leave a very small profile. There may also be economic benefit to have one levelling bracket 12 for each LiDAR device 13 but one wall mounting plate 11 for every location from which monitoring is needed. It is almost invariably the case in a mining application that there are more places to monitor than monitoring devices available.

Although the preferred embodiment has been described in terms of use with a LiDAR device it will be appreciated that the invention is not limited to this specific monitoring device. The mounting bracket can also be used with other monitoring equipment, or indeed any equipment which may need to be removed from time to time to avoid damage.

Persons skilled in the art will also recognize that the invention is not limited to the specific structures described above and shown in the figures. For instance, the locking screw could be a spring-loaded over-centre clamp. Also, the hinge plate and hinge slot could instead be a straight pin with hinge knuckles formed on the levelling bracket and the wall mounting plate. However, the inventors have found that the embodiment described above is appropriate for a harsh environment like an underground mine.

The mounting bracket described herein is simple, robust and low cost. The wall mounting plate can be left in place and, due to a low profile, there is a reduced chance of damage. The levelling bracket can be quickly and easily fixed in place in a reproducible manner.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

What is claimed is:

1. A mounting bracket comprising:
   a wall mounting plate;
   a levelling bracket removably attachable to the wall mounting plate;
   a gimbal mounted on the levelling bracket and a tribrach mounted on the gimbal;
   a first hinge member on one of the wall mounting plate or the levelling bracket and a second hinge member on the other of the wall mounting plate or the levelling bracket, the first hinge member and the second hinge member together forming a hinge that engages between the wall mounting plate and the levelling bracket; and
   a locking screw that locks the hinge to prevent hinged movement between the levelling bracket and the wall mounting plate.

2. The mounting bracket of claim 1 wherein the wall mounting plate includes apertures for receiving bolts for fixing the wall mounting plate to a wall or roof.

3. The mounting bracket of claim 1 wherein the first hinge member is a hinge slot and the second hinge member is a hinge plate.

4. The mounting bracket of claim 3 wherein the hinge slot further comprises a stop that limits the range of movement of the hinge plate.

5. The mounting bracket of claim 4 wherein the stop is a lip that prevents the hinge plate sliding from the wall mounting plate.

6. The mounting bracket of claim 3 wherein the hinge slot and the hinge plate are shaped to provide repeatable location with angled surfaces and edges.

7. The mounting bracket of claim 6 wherein the hinge slot comprises a V-groove.

8. The mounting bracket of claim 3 wherein the hinge slot is shaped for fall-prevention.

9. The mounting bracket of claim 1 wherein the locking screw comprises a threaded shaft that engages a threaded hole in the wall mounting plate.

10. A method of removably mounting a device including the steps of:
   fixing a wall mounting plate to a wall or roof, the wall mounting plate including a first hinge member;
   removably attaching a levelling bracket to the wall mounting plate, the levelling bracket including a second hinge member;
   mounting a gimbal on the levelling bracket;
   mounting a tribrach on the gimbal;
   forming a hinge with the first hinge member and the second hinge member such that the levelling bracket is pivotable with respect to the wall mounting bracket;
   in use, locking the levelling bracket to the wall mounting plate with a locking screw;
   wherein the first hinge member or the second hinge member is a hinge slot and the other of the first hinge member or the second hinge member is a hinge plate.

11. The method of claim 10 including the step of tightening the locking screw for locking the levelling bracket in place relative to the wall mounting plate.

12. The method of claim 10 including the step of loosening the locking screw before removing the levelling bracket from the wall mounting plate.

13. The method of claim 11 further including the step of lifting the levelling bracket relative to the wall mounting plate for removal.

* * * * *